United States Patent
Birzer et al.

(10) Patent No.: US 9,787,682 B2
(45) Date of Patent: Oct. 10, 2017

(54) METHOD AND SYSTEM FOR CONNECTING A CONTROLLER FOR A MACHINE TO A HIGHER-LEVEL IT SYSTEM

(71) Applicant: Siemens Aktiengesellschaft, München (DE)

(72) Inventors: Johannes Birzer, Rezelsdorf (DE); Rainer Ordenewitz, Fellbach-Oeffingen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/038,228

(22) Filed: Sep. 26, 2013

(65) Prior Publication Data

US 2014/0090017 A1 Mar. 27, 2014

(30) Foreign Application Priority Data

Sep. 27, 2012 (EP) .................................... 12186404

(51) Int. Cl.
*H04L 29/06* (2006.01)
*G06F 21/56* (2013.01)
*H04L 29/08* (2006.01)

(52) U.S. Cl.
CPC .............. *H04L 63/10* (2013.01); *G06F 21/56* (2013.01); *H04L 67/12* (2013.01)

(58) Field of Classification Search
CPC .......... H04L 63/10; H04L 67/12; G06F 21/56
See application file for complete search history.

(56) References Cited

U.S. PATENT DOCUMENTS

| | | | | |
|---|---|---|---|---|
| 6,571,136 B1* | 5/2003 | Staiger | ................... | H04L 12/40 370/403 |
| 7,536,548 B1* | 5/2009 | Batke et al. | .................. | 713/166 |
| 7,818,087 B2 | 10/2010 | Birzer et al. | | |
| 8,281,385 B2* | 10/2012 | Callagahan | ..................... | 726/15 |
| 8,788,572 B1* | 7/2014 | Walsh | ..................... | H04L 29/06 709/203 |
| 2002/0112038 A1* | 8/2002 | Hessmer et al. | ............... | 709/220 |
| 2002/0112044 A1* | 8/2002 | Hessmer et al. | ............... | 709/223 |
| 2003/0109942 A1* | 6/2003 | Yeh et al. | ........................ | 700/83 |
| 2003/0126456 A1 | 7/2003 | Birzer et al. | | |
| 2003/0188157 A1 | 10/2003 | Birzer et al. | | |
| 2007/0005805 A1* | 1/2007 | Drath et al. | .................. | 709/246 |
| 2007/0043675 A1 | 2/2007 | Birzer et al. | | |
| 2007/0079355 A1* | 4/2007 | Chand et al. | ..................... | 726/2 |
| 2009/0088891 A1 | 4/2009 | Birzer et al. | | |

(Continued)

FOREIGN PATENT DOCUMENTS

WO WO 0223405 A1 3/2002
WO WO 0223875 A1 3/2002

*Primary Examiner* — Eleni Shiferaw
*Assistant Examiner* — Alexander Lapian
(74) *Attorney, Agent, or Firm* — Henry M. Feiereisen LLC

(57) ABSTRACT

In a method for securely connecting a controller for a machine or plant to a higher-level IT system, an integration layer is provided between the controller and the IT system, a controller image of the controller is generated in the integration layer, and the controller image is accessed from the IT system. The IT system thus always accesses the controller image rather than directly the controller. This prevents malware from gaining access to the controller e.g. via a network.

14 Claims, 3 Drawing Sheets

(56) References Cited

U.S. PATENT DOCUMENTS

2009/0182440 A1* 7/2009 Kassou ................ G05B 19/054
  700/7
2011/0039237 A1* 2/2011 Skare ............................ 434/118
2011/0276907 A1* 11/2011 Burkhardt et al. ........... 715/760

* cited by examiner

METHOD AND SYSTEM FOR CONNECTING A CONTROLLER FOR A MACHINE TO A HIGHER-LEVEL IT SYSTEM

CROSS-REFERENCES TO RELATED APPLICATIONS

This application claims the priority of European Patent Application EP 12186404.5, filed Sep. 27, 2012, pursuant to 35 U.S.C. 119(a)-(d), the content of which is incorporated herein by reference in its entirety as if fully set forth herein.

BACKGROUND OF THE INVENTION

The present invention relates to a method and system for connecting a controller for a machine to a higher-level IT system.

When using controllers in production, connection of the controllers to a higher-level IT system is becoming increasingly important. Higher-level IT systems include Manufacturing Execution Systems (MES), control rooms, SCADA (Supervisory Control and Data Acquisition) or MRO (Maintenance, Repair and Overhaul) systems. This integration into an overall system has hitherto been implemented on a project basis. IT security aspects have only been considered to a limited extent. It is only since the appearance of the Stuxnet computer virus that security has also become an issue in automation and production engineering. The security of today's conventional solutions is coming under ever greater scrutiny.

The prior art is illustrated in FIG. 1 in which the controllers A, B, C and D are used for open- or closed-loop control of machines or plants. These are, for example, programmable logic controllers, machine tool controls, production machine controls, etc. The controllers A to D can be of identical or different design, in particular also for different applications, and also come from different manufacturers. The individual controllers are intended to be accessed by a higher-level IT system, e.g. to control or monitor a production facility. For this purpose the higher-level IT system has the interfaces IntA, IntB, IntC and IntD. Said higher-level IT system accesses the network interface NI of a controller via the standard network protocols using the typical communication mechanisms such as DCOM, socket, http, https, etc. The network interface NI is a (standardized) interface which can be interrogated for the predefined information. Different universal standards such as OPC or OPC UA exist, but also company-specific or user-group-specific interfaces. The higher-level IT system controls access to the network interfaces NI and, for example, reads data from the controllers A to D via said interfaces, as indicated by the arrows.

This procedure has the following prerequisites:
All the controllers must be visible and addressable, i.e. accessible, for the higher-level IT system. From a security perspective, this is a major vulnerability. The controllers thus offer a point of attack and require special protection. Because the network interfaces are public knowledge, this makes the controllers much easier to attack.
The higher-level IT system has to coordinate and synchronize the accesses to the controllers. Therefore, "knowledge" of the controllers is necessary at the higher order IT level. This means that controller-specific implementation of components at IT system level is necessary, resulting in much greater complexity. In addition, functions often have to be adapted to suit the different types of controllers.

For the controllers this means that in many cases additional third party software for IT system integration has to be installed. This software is specific to the IT system. This accordingly produces a great multiplicity of potential software components which must be installed on the controllers by an OEM after commissioning. The resulting problems in respect of warranty and stability remain to be resolved.

It would therefore be desirable and advantageous to obviate prior art shortcomings and to provide an improved method and a system for securely connecting at least one controller for a machine to a higher-level IT system

SUMMARY OF THE INVENTION

According to one aspect of the present invention, a method for connecting at least one controller for a machine or plant to a higher-level IT system includes providing an integration layer between the at least one controller and the IT system, generating a controller image of the controller in the integration layer, and accessing the controller image from the IT system.

According to another aspect of the present invention, a system for connecting a controller for a machine or plant to a higher-level IT system includes at least a controller, a higher-level IT system, and an integration layer connected between the controller and the IT system. The integration layer includes a controller image of the controller, and the higher-level IT system and the integration layer are configured for allowing the higher-level IT system access to the controller image.

The system according to the invention is characterized by an integration level (which can also be termed an integration layer). This level comprises today's conventional IT interfaces and is advantageously provided on a standard hardware and/or software platform, e.g. a server, running under a Windows operating system. The integration layer is visible in a network, but can be securely operated like any other software on the basis of the IT standards used.

The data describing the current state of the controller and the corresponding controller image data in the integration layer are essentially based on parameters. Parameters are generally (controller-relevant) variables, characterizing properties or quantities. These include incoming sensor signals to the controller, such as a motor speed, or outgoing actuator signals from the controller. States, changes of state or events are also described by corresponding parameters. A particular parameter can also be composed of a combination of other parameters, e.g. the parameter "total quantity" from the sum of the parameters "quantity A" and "quantity B".

According to the invention, a controller image is created in the integration layer. For this purpose, data relating to the controller, in particular the current values of essential controller parameters, are transmitted to the integration layer—preferably continuously or at particular times or depending on particular events.

The controller automatically collects the necessary data (information) and transmits it to the integration layer, thus generating in the integration layer an image of the controller based on the data collected. This image is then the source for access by the higher-level IT system. Direct access to the controllers does not take place. The controller itself is not visible in the network. This can be achieved by using different network components already available today.

The controller image in the integration layer is advantageously updated on an event-triggered basis. Whenever particular, predefined events occur, e.g. a particular parameter changes, the controller image is updated. However, the updating can also take place on a time-dependent basis, e.g. at particular intervals. The triggers for updating the controller image are advantageously adjustable, i.e. adaptable.

In addition, the comprehensiveness of the controller image in the integration layer can also be advantageously adapted. Thus, it is not necessary for the values of all the parameters relating to the controller to be continuously transmitted from the controller to the integration layer or updated, but only the data that is relevant from the perspective of the higher-level IT system. For this purpose the integration layer preferably has at least one configuration file by which the controller parameters whose values are to be transmitted to the integration layer are specified. The configuration file can be accessed from the higher-level IT system. The controller then sends the relevant information specified in the configuration file automatically and without further access from outside the controller. In addition, the controller interrogates the configuration file—advantageously at particular times or depending on particular events (e.g. after startup)—so that an adaptation can take place as to which data for generating the controller image is transmitted to the integration layer. This also avoids direct access to the controller from outside. Instead, the controller is always self-activated for communication between the controller and the integration layer.

The respective controller image and the configuration file are advantageously accessed by the higher-level IT system via two separate interfaces: a Controller Data Access (CDA) Interface for accessing the controller image and a Controller Data Configuration (CDC) Interface for accessing the configuration file. This provides strict separation between data transfer from the integration layer to the higher-level IT system via a first interface (CDA Interface), and data transfer from the higher-level IT system to the integration layer via a second interface (CDC Interface).

The configuration data is advantageously available in the integration layer on the basis of a generic, i.e. non-proprietary data model. In this case it must first be transferred (preferably on the controller) to a controller-specific data model before the controller can acquire the parameters specified by the configuration file. If the data describing the state of the controller is likewise to be provided on the basis of a generic data model in the integration layer, a corresponding transformation of the data may first be necessary. This transformation also preferably takes place on the controller before the data is transmitted from the controller to the integration layer.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
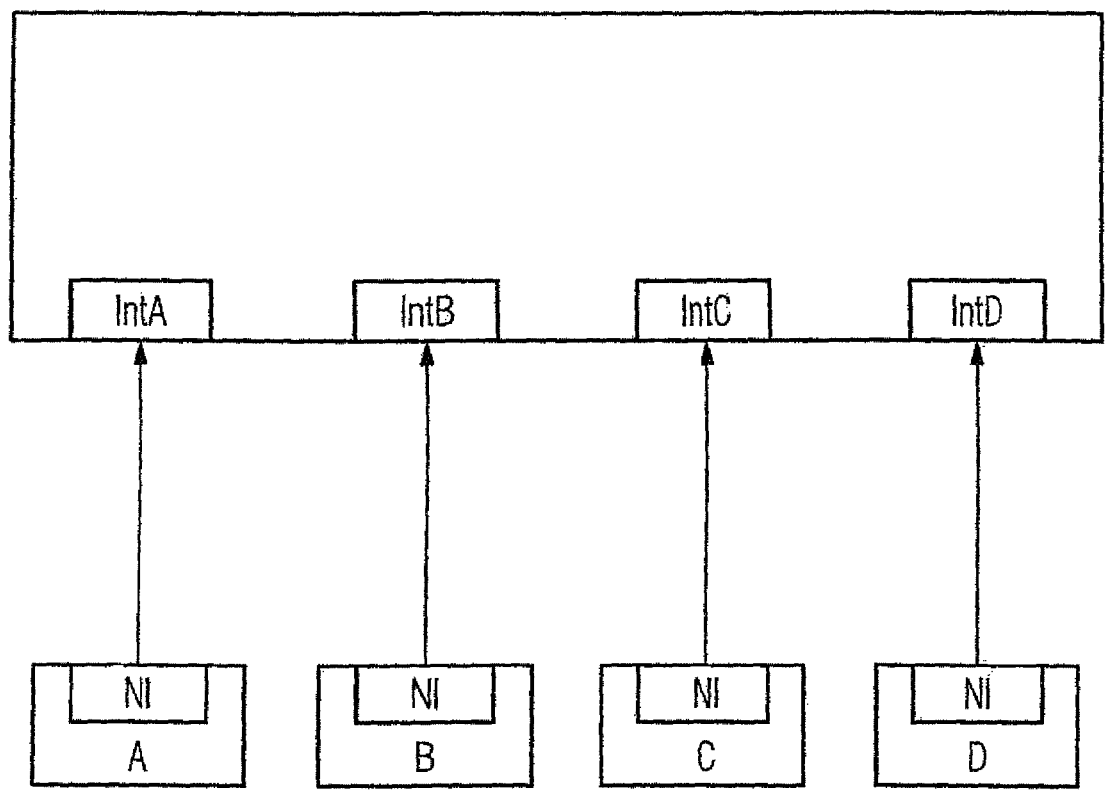
FIG. 1 shows conventional controller access from a higher-level IT system.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
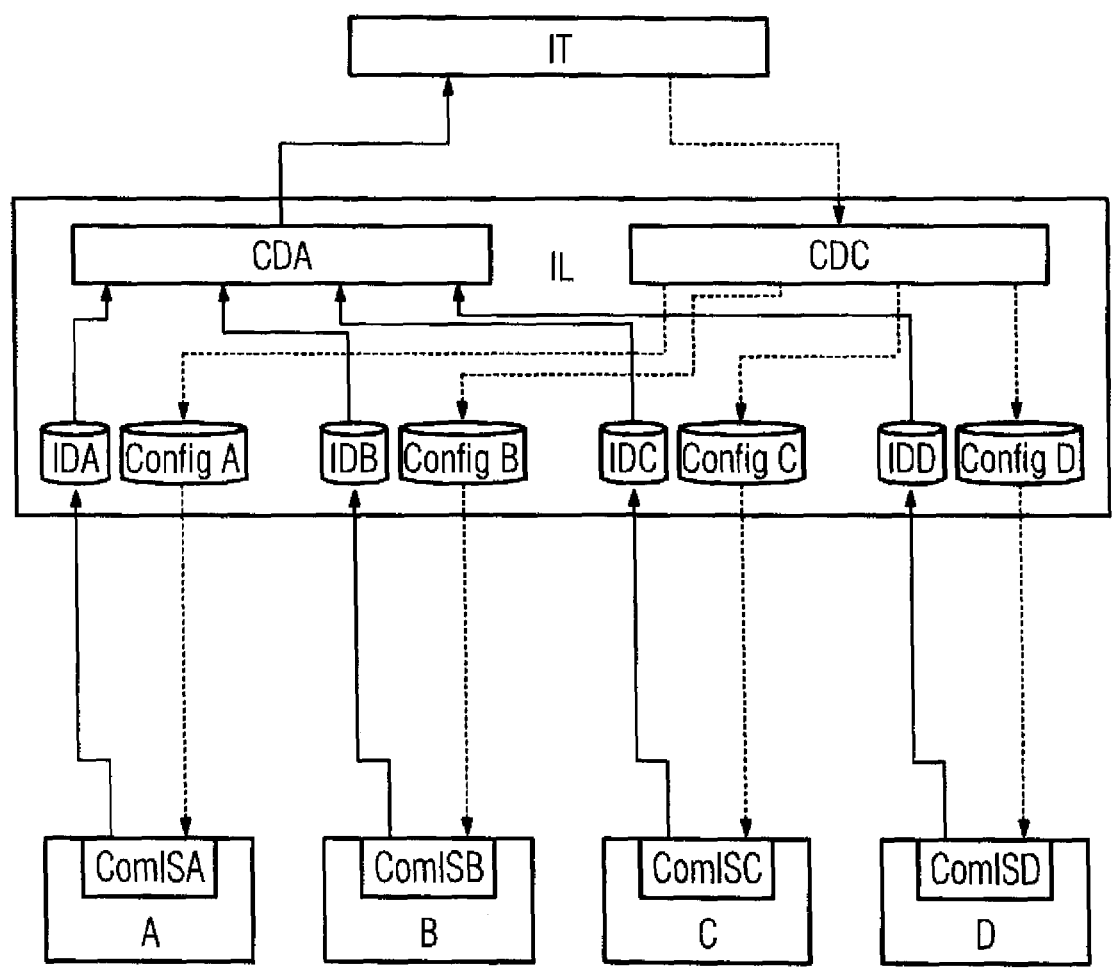
FIG. 2 shows a system for connecting a controller for a machine to a higher-level IT system according to the present invention.

Turning now to the drawing, and in particular to FIG. 2, there is shown an exemplary embodiment illustrating the inventive method for securely connecting a plurality of controllers A, B, C and D to a higher-level IT system (denoted by "IT" in FIG. 2) and in particular the data flow within the overall system. Said data flow from the respective controllers A to D to the higher-level IT system is indicated by solid arrows and the data flow from the higher-level IT system to the controllers A to D by dashed arrows.

The controllers A to D can be of identical or different design and, in particular, come from different manufacturers. They control e.g. a plurality of machines or plants in a manufacturing facility. A higher-level IT system, e.g. a manufacturing execution system (MES), is present for monitoring the machines and plants in the manufacturing facility. The IT system enables production in the manufacturing facility to be managed, directed, controlled or inspected in real time. To achieve this, comprehensive collection and processing of machine data is necessary. According to the invention, however, the higher-level IT system does not access the controllers A to D directly for this purpose, but accesses an intermediate integration layer IL. The latter comprises software which can be run in particular on a commercially available server and under a Windows operating system, i.e. on a standard hardware and software platform. To increase data security it is not possible according to the invention for the IT system to access the controllers A to D directly. Instead, a controller image (image data) IDA, IDB, IDC, IDD of the respective controller A to D is created in the integration layer IL. Said controller images IDA to IDD can in principle contain all the data that would also be retrievable by directly accessing the respective controller. In general, however, not all the retrievable data of the controllers A to D is of interest to the higher-level IT system, so that the controller images IDA to IDD in general mirror only a portion of the data provided by the controllers A to D.

The integration layer IL advantageously comprises at least one configuration file which specifies which data is read from the respective controller A to D and stored in the controller image IDA to IDD. In the exemplary embodiment, each controller A to D is assigned its own configuration file, namely controller A is assigned configuration file Config A, controller B is assigned configuration file Config B, controller C is assigned configuration file Config C, and controller D is assigned configuration file Config D.

In addition, data preparation can also take place in the integration layer IL, whereby the data generated by the controllers A to D is processed, combined, etc. For this purpose appropriate algorithms can be stored in the configuration file or more precisely in the configuration files Config A to Config D. In particular, the configuration file can be used to specify which parameters are transmitted from the controller in question to the integration layer IL and possibly how individual controller parameters are to be combined prior to transmission.

The controller image of the respective controller is persistently stored in the integration layer IL. It is the image of the information generated on the controller. The extent and persistence (i.e. the length of time for which the data is kept available) are specifically defined.

In the context of the invention, data transfer between a controller A to D and the integration layer IL is always initiated by the respective controller, regardless of whether retrieval of the configuration data from a configuration file Config A to Config D by the respective controller A to D or transmission of data for the respective controller image IDA to IDD to the integration layer IL is involved. This avoids directly accessing the controllers from the outside. Instead, for communication between a controller and the integration layer IL, the respective controller is always self-activated.

In the preferred embodiment of the invention according to FIG. 2, the integration layer IL comprises two interfaces for communication with the higher-level IT system: the Controller Data Access Interface CDA and the Controller Data Configuration Interface CDC.

The controller images IDA to IDD are accessed by the higher-level IT system via the Controller Data Access Interface CDA. This can be implemented as a generic interface and thus have a standard data structure, so that the controller images of different manufacturers can be accessed via a standard data format, e.g. per OPC (Object Linking and Embedding for Process Control, a standardized software interface in the field of automation systems). However, an interface specific to the respective controller can also be provided.

The configuration files Config A to Config D which are used to define properties of the controller images IDA to IDD are accessed by the higher-level IT system IT via the Controller Data Configuration Interface CDC. Any transformations necessary e.g. for converting the data from a specific to a generic data model are also performed via this interface. The comprehensiveness of the images IDA to IDD, i.e. the selection of the parameters whose values are to be transmitted in each case, can advantageously be set via the higher-level IT system. Depending on requirements, the comprehensiveness of the respective image can therefore be modified by appropriate configuration in the integration layer IL.

In the exemplary embodiment, communication between the controllers A to D and the integration layer IL takes place via communication and infrastructure interfaces ComISA, ComISB, ComISC and ComISD which control and coordinate the data transfers, it also being possible to fall back on using known and usual network components. This infrastructure ensures that the data is transported completely, consistently and securely, even if e.g. network problems were to occur.

Figure 3:
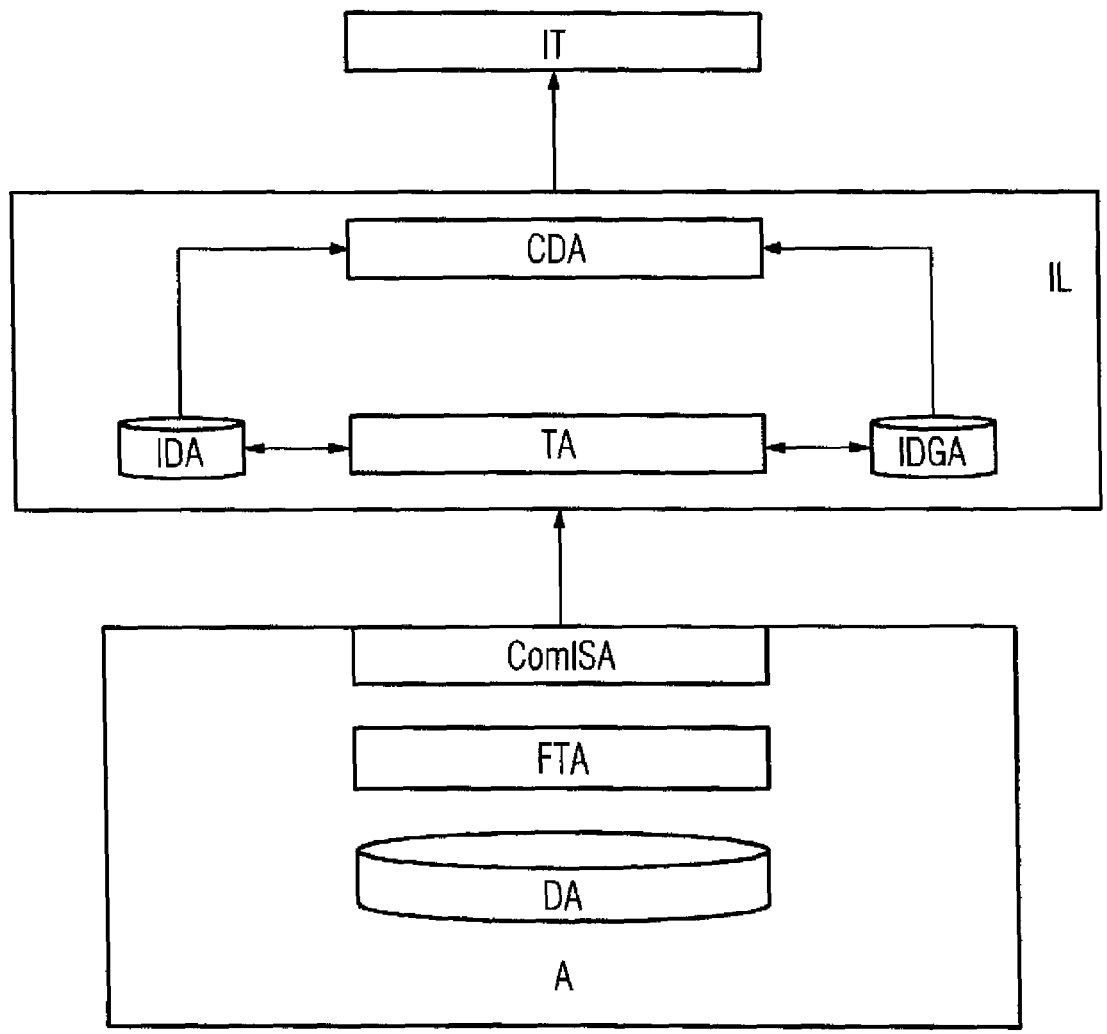
FIG. 3 shows the generation of a controller image of the controller A according to the present invention.

In FIG. 3, the generation of a controller image and the transmission of the data to a higher-level IT system is illustrated in greater detail for the controller A by way of example. This is based around the internal data storage and the interfaces available within the controller A for accessing the data. In the controller A, in a first step, controller-specific data DA reflecting the current state of the controller or more specifically of the thereby controlled machine or plant is therefore collected and stored in a memory. In particular, controller-relevant parameters are acquired and recorded within the controller. The internal data storage thus constitutes the controller A image to be mirrored. In order to be able to implement this functionality also generically if necessary, transformation of the data into a generic (i.e. non-proprietary) data model is advantageously provided in the exemplary embodiment. The transformation is preferably performed using a filtering and transformation unit FTA of the controller A on the basis of configuration data describing the corresponding relationships.

Transformation into a generic data model means in particular that both events and the parameter values corresponding to the respective event are transferred to a characteristic—characteristic value structure. This transfer is controller-dependent and is part of the controller-specific implementation. The extent of the controller-specific implementation is therefore limited to bidirectional implementation of the transformation for data acquisition and configuration of the data to be acquired. On this basis, a generic runtime environment is advantageously available. In this environment, it can be defined (e.g. using a scripting language) which events are to be used as triggers for data acquisition and what information is ultimately to be collected. The raw data is if necessary combined with other information, algorithms are executed and the data thus obtained is finally prepared for transfer to the integration layer. In this runtime environment, the controller-specific interface is configured and "activated" via the generic functions of the runtime environment.

In short, an abstraction of the information takes place, in particular the transformation of the controller-specific structures into a general (generic) data model, based on events, characteristics or more specifically parameters and values which represent in total the respective state of the controller and therefore of the machine controlled thereby.

In addition, the information is filtered in the filtering and transformation unit FTA so that only the information relevant for the higher-level IT system is transferred to the controller image. The filtering is based in particular on the data or more specifically parameters determined by the configuration file Config A (see FIG. 2), thereby enabling unnecessary computing capacity or network loading for data transfer to be avoided.

In the exemplary embodiment, communication between the controller A and the integration layer IL takes place on the basis of the generic data model (and therefore manufacturer-independently) in a secure and reliable form via the communication and infrastructure interface ComISA. Said communication is always initiated by the controller A (outbound communication), even if data is to be transferred from the integration layer IL to the controller A, e.g. configuration data. It takes place in particular on an event-controlled basis. The communication and infrastructure interface ComISA ensures that the information is encapsulated (i.e. can be securely transported even in unsecure networks) and arrives unambiguously at the defined destination. In this respect the system places no particular requirements on the security characteristics of the IT network. Communication between the communication and infrastructure interface ComISA and the integration layer IL is encapsulated and inherently secure. The communication and infrastructure interface ComISA also ensures that the information is transmitted completely and consistently to the integration layer IL. This guarantees that the information is also available on the controller image at a time when the data is consistent.

The data transmitted to the integration layer IL is then stored in a generic database IDGA (Image Data Generic A) which constitutes the image of the controller or rather of the machine controlled thereby in the integration layer IL. Advantageously, the higher-level IT system can directly access this data and therefore the controller image in the integration layer via the Controller Data Access Interface CDA. This database is used to provide, also in the integration layer, the interfaces currently available as standard on the controller. Consequently, applications currently using the controller's interfaces can continue to be used via corresponding interfaces in the integration layer. This means that the currently unsecure accessing of the controller in question "from outside" is no longer necessary. Moreover, repercussions for the control system are prevented. The proposed solution also allows implementation as a product based on the generic procedure which dramatically reduces the implementation cost/complexity.

In the exemplary embodiment according to FIG. 3 it is possible, by means of a transformation unit TA incorporated in the integration layer IL, to convert the data IDGA stored on the basis of the generic data model in the integration layer IL back into a controller-specific data model and provide the higher-level IT system with the mirror image IDA of the controller A for access in a controller-specific format. The advantage of this is that the integration layer IL can be easily incorporated into an existing overall system in which the higher-level IT system has hitherto read from the controller in question the data stored on the basis of a controller-specific data model. The software previously used on the higher-level IT system can therefore continue to be used at least virtually unchanged.

In a preferred variant of the invention, the data generating an image of a controller can be provided in the integration layer IL both on the basis of a generic data model and on the basis of a controller-specific data model. The integration layer therefore comprises both a controller-specific image IDA and a generic image IDGA of the controller A. The higher-level IT system can therefore make a selection in respect of the desired data model on which the controller image is based. The transformation unit TA encompassed by the integration layer IL can preferably convert the data in both directions between the different data models, so that the data can always be provided in both formats in the integration layer IL, irrespective of the type of data model on the basis of which the controller in question supplies the data.

Figure 4:
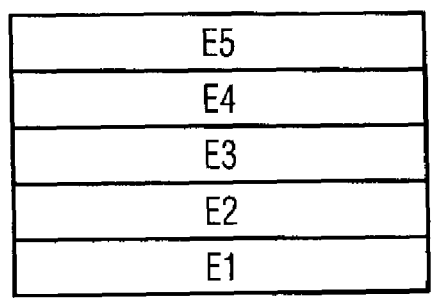
FIG. 4 shows communication levels for communication between the controller and the integration layer according to the present invention.

The communication and integration interfaces ComISA to ComISD advantageously incorporate the communication levels provided (see FIG. 4) for data transfer (communication) between a controller A to D and the integration layer IL:

The basic or lowest level E1 is the "standard connectivity layer", i.e. the basis of network services for communication in IT networks, e.g. TCP/IP. This layer ensures communication between the participants. There are no particular requirements in terms of security or reliability. The benefit for users is that they do not need to change or adapt their network infrastructure. In particular, it is possible in the advent of technological advances to switch to a newer technology without having to make changes in the actual application.

The next layer E2 is constituted by the security layer. This layer is based on available standard security mechanisms and ensures secure data transport. Secure transport ensures that the information is encapsulated (i.e. can be securely transported even in unsecure networks) and arrives unambiguously at the defined destination. In this respect the system places no particular requirements on the security characteristics of the IT network. Communication between the communication and infrastructure interface and the integration layer is encapsulated and inherently secure.

Encapsulating this layer makes it possible, over the long life cycle of industrial controllers, to replace this layer and if necessary bring it up to the latest state of the art.

The same applies to the "fail-safe layer" E3 which ensures complete transfer of the data. Particularly in a harsh industrial environment it is important to check that the data is being transferred completely and correctly.

The actual information or data transmission takes place via the two top layers E4 and E5:

The "generic configuration layer" E4 transports the configuration information over the network, i.e. the information as to what data is to be transferred from the controller to the integration layer. The communication is advantageously initiated by the respective controller A to D and not by the integration layer IL or the higher-level IT system. The controllers effectively enquire what data is to be supplied. The corresponding data which creates the "mirror" of the particular controller A to D is then transported across the network via the "generic content layer" E5.

The layer model allows encapsulation, thereby making the core application (e.g. the part program of a machine tool) with its relatively long life cycle largely independent of the components that are subject to a short life cycle. This procedure therefore allows selective replacement of the security-relevant components having a short life cycle. The security-relevant programs can therefore be kept constantly updated without needing to make changes to the controller programs (e.g. a part program).

This structure has the following advantages for the higher-level systems:
  The security aspects are covered by
    making the interface to higher-level systems compliant with the standard IT rules,
    making communication between controller and interface private and encapsulated. No accessing of the controller from outside therefore takes place; the controller is "invisible" from the outside,
    any repercussions of accessing of the control equipment by the higher-level system are prevented by the proxy concept (i.e. access to a mirror image of a controller).
  The currently used IT systems or higher-level interfaces can continue to be used—but are now provided on a secure basis. The currently available software can continue to be used.
  The higher-level systems have a (non-proprietary) interface for all the controller components. No adaptation to the specifics of a particular controller is necessary. This is carried out by the controller manufacturers themselves, particularly for implementation of the respective communication and integration interface and if necessary for defining a proxy. Depending on which interfaces are implemented, it can be ensured that currently available systems can continue to be used without changing the software.
  From the controller manufacturer and OEM perspective, the installation of third party software on the controller after delivery can be avoided, thereby minimizing the problems in respect of warranty and stability and also in terms of security. The best protection against malware threats is that it is basically unnecessary or even impossible to install software.
  In summary, these advantages are achieved by:
    creating a controller image at server level which allows functions based on controller data to be used from outside without it being necessary to access the controller itself (proxy concept), adaptably defining the controller image. The information to be provided can be defined (content-wise and time-wise) depending on current requirements, providing this information on a computer that is standardized and always compliant with current security requirements. Specific adaptations to the respective constraints are not necessary. The modern security concepts can be reproduced.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for connecting at least one controller for a machine or plant to a higher-level IT system in a manufacturing environment, comprising:
    providing a integration layer,
    providing a controller image of the controller in the integration layer, said controller image having data describing a current state of the controller using parameters monitored by the higher-level IT system, wherein the integration layer comprises a configuration file defining characteristics of the controller image, said parameters including incoming sensor signals to the controller or outgoing actuator signals from the controller and being composed of a combination of a sum of the same or other parameters,
    accessing the controller image of the controller in the integration layer from the higher-level IT system,
    configuring the controller to initiate all communication with the integration layer and the controller so as to be invisible to the higher-level IT system in the computer network,
    prior to transmitting a controller-relevant data or data derived from the controller relevant data to the integration layer, filtering the controller relevant data or transforming the controller-relevant data into a generic data model, and
    back-transforming the controller-relevant data transmitted to the integration layer into a proprietary data model prior to forwarding the controller-relevant data to the integration layer,
    wherein the controller image is accessed in the integration layer via a Controller Data Access (CDA) interface, wherein the configuration file is accessed via a Controller data Configuration (CDC) interface, and wherein a complete separation is provided between a data transmission from the integration layer to the higher-level IT system via the Controller Data Access interface and a data transmission from the higher-level IT system to the integration layer via the Controller Data Configuration interface.

2. The method of claim 1, wherein the integration layer is provided on at least one of a standard hardware and software platform.

3. A system for connecting at least one controller for a machine or plant to a higher-level IT system in a manufacturing environment, comprising:
    a controller,
    a higher-level IT system,
    a hardware integration layer connected between the controller and the IT system, and
    an image of the controller in said integration layer, said controller image having data describing a current state of the controller using parameters, monitored by the higher-level IT system, wherein the integration layer comprises a configuration file defining characteristics of the controller image, said parameters including incoming sensor signals to the controller or outgoing actuator signals from the controller and being composed of a combination of a sum of the same or other parameters, said controller being configured to initiate all communication between the integration layer and the controller so as to be invisible to the higher-level IT system in the computer network, wherein prior to transmitting a controller-relevant data or data derived from the controller relevant data to the integration layer the controller relevant data is filtered or transformed into a generic data model and back-transformed into a proprietary data model prior to being forwarded to the integration layer, and
    a Controller Data Access (CDA) interface for accessing the controller image and a Controller Data Configuration (CDC) interface for accessing the configuration file, wherein a complete separation is performed between a data transmission from the integration layer to the higher-level IT system via the Controller Data Access interface and a data transmission from the higher-level IT system to the integration layer via the Controller Data Configuration interface.

4. The system of claim 3, wherein the integration layer is provided on at least one of a standard hardware and a software platform.

5. The system of claim 3, wherein the controller comprises a memory for accumulating controller-relevant data.

6. The system of claim 3, wherein the controller comprises filtering and transformation unit for filtering a controller-relevant data collected by the controller or transforming the controller-relevant data into a generic data model.

7. The system of claim 6, wherein the integration layer comprises a transformation unit which back-transforms the data stored in form of a generic data model into data stored in form of a controller-specific data model.

8. The method of claim 1, wherein the controller image in the integration layer is a mirror image of the controller image communicated to the integration layer, further comprising the step of deriving data used in the controller image using a combination of parameters monitored by the controller.

9. The system of claim 3, wherein the controller image in the integration layer is a mirror image of the controller image communicated to the integration layer from the controller, further comprising: data in the controller image communicated to the integration layer from the controller derived using a combination of parameters monitored by the controller.

10. The system of claim 3, further comprising a proxy server connected to communicate a controller image to the integration layer.

11. Apparatus for connecting at least one controller for a machine or plant to a higher-level IT system in a manufacturing environment, comprising:

a hardware integration layer adapted to be connected between the controller and the IT system, and an image of the controller adapted to be provided in said integration said integration layer, said controller image having data describing a current state of the controller using parameters, monitored by the higher-level IT system, wherein the integration layer comprises a configuration file defining characteristics of the controller image, said parameters including incoming sensor signals to the controller or outgoing actuator signals from the controller and being composed of a combination of a sum of the, same or other parameters, wherein the controller is configured to initiate all communication between it and the integration layer so as to be invisible in a computer network, the higher-level IT system accessing data describing a current state of the controller in the image of the controller in said integration layer, wherein prior to transmitting a controller-relevant data or data derived from the controller relevant data to the integration layer the controller relevant data is filtered or transformed into a generic data model and back-transformed into a proprietary data model prior to being forwarded to the integration layer, and a Controller Data Access (CDA) interface for accessing the controller image and a Controller Data Configuration (CDC) interface for accessing the configuration file, wherein a complete separation is performed between a data transmission from the integration layer to the higher-level IT system via the Controller Data Access interface and a data transmission from the higher-level IT system to the integration layer via the Controller Data Configuration interface.

12. The method of claim 1, wherein said controller retrieves configuration data provided by the higher-level IT system to the integration layer from the integration layer.

13. The system of claim 3, wherein said controller retrieves configuration data provided by the higher-level IT system to the integration layer from the integration layer.

14. The apparatus of claim 11, wherein said controller retrieves configuration data provided by the higher-level IT system to the integration layer from the integration layer.

* * * * *